(12) United States Patent
Kim et al.

(10) Patent No.: US 12,325,451 B2
(45) Date of Patent: Jun. 10, 2025

(54) METHOD OF CONTROLLING BRAKING IN RESPONSE TO SENSOR FAILURE IN AUTONOMOUS VEHICLES

(71) Applicants: Hyundai Motor Company, Seoul (KR); Kia Corporation, Seoul (KR)

(72) Inventors: In Su Kim, Anyang-Si (KR); Myung Ki Yeom, Incheon (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 245 days.

(21) Appl. No.: 17/984,554

(22) Filed: Nov. 10, 2022

(65) Prior Publication Data
US 2023/0415782 A1    Dec. 28, 2023

(30) Foreign Application Priority Data
Jun. 28, 2022 (KR) .......... 10-2022-0078795

(51) Int. Cl.
*B60W 60/00* (2020.01)
*B60W 10/188* (2012.01)
(Continued)

(52) U.S. Cl.
CPC .... *B60W 60/00186* (2020.02); *B60W 10/188* (2013.01); *B60W 50/0205* (2013.01);
(Continued)

(58) Field of Classification Search
CPC ......... B60T 2270/406; B60T 2270/413; B60T 8/171; B60T 8/885; B60W 10/188;
(Continued)

(56) References Cited

U.S. PATENT DOCUMENTS 3,128,846 A * 4/1964 Stelzer ............... B60T 8/26
188/152
3,719,398 A * 3/1973 Takayama et al. ..............
B60T 8/17613
303/166
(Continued)

FOREIGN PATENT DOCUMENTS

KR    2019-0012954 A    2/2019

OTHER PUBLICATIONS

240906 KR20190012954A machine translation (Year: 2019).*

*Primary Examiner* — Carl C Staubach
(74) *Attorney, Agent, or Firm* — Morgan, Lewis & Bockius LLP (57) ABSTRACT

In a braking control method of responding to sensor failure for autonomous vehicles, when a braking-related sensor, such as a G sensor or a braking hydraulic sensor, has failed while driving of an autonomous vehicle, the host vehicle requests a nearby another autonomous vehicle determine a deceleration of the host vehicle and transmit deceleration information to the host vehicle. The host vehicle accurately determines a braking hydraulic pressure based on the deceleration information received from the aid vehicle and apply the accurate braking hydraulic pressure to a braking device. In the present manner, even in the case in which it is difficult to convert the vehicle to manual driving, the host vehicle is able to drive to a destination or a safe place.

16 Claims, 3 Drawing Sheets

(51) Int. Cl.
*B60W 50/02* (2012.01)
*B60W 50/029* (2012.01)

(52) U.S. Cl.
CPC ... *B60W 50/029* (2013.01); *B60W 2050/0215* (2013.01); *B60W 2556/45* (2020.02)

(58) Field of Classification Search
CPC ......... B60W 2556/45; B60W 50/0205; B60W 50/029; B60W 60/00186
See application file for complete search history.

(56) References Cited

U.S. PATENT DOCUMENTS

| | | | |
|---|---|---|---|
| 5,420,794 A * | 5/1995 | James | G08G 1/096716 340/991 |
| 8,560,609 B2 * | 10/2013 | Nathanson | H04L 69/164 709/224 |
| 11,919,547 B1 * | 3/2024 | Komori | B60W 30/182 |
| 2013/0015984 A1 * | 1/2013 | Yamashiro | G08G 1/22 340/988 |
| 2015/0109903 A1 * | 4/2015 | Nasir | H04L 41/0668 370/221 |
| 2017/0067764 A1 | 3/2017 | Skupin et al. | |
| 2019/0051015 A1 * | 2/2019 | Gonzalez Aguirre | G06T 7/33 |
| 2019/0258875 A1 * | 8/2019 | Flores-Bamaca | G08G 1/096791 |
| 2020/0331482 A1 | 10/2020 | Schiemenz | |
| 2020/0361480 A1 * | 11/2020 | Rodriguez Bravo | B60W 60/0015 |
| 2021/0063546 A1 * | 3/2021 | Slobodyanyuk | G01S 13/91 |
| 2021/0179105 A1 * | 6/2021 | Kim | B60W 30/18163 |
| 2021/0239492 A1 * | 8/2021 | Yano | G05D 1/0214 |
| 2022/0256333 A1 * | 8/2022 | Whyte | H04W 12/0471 |

* cited by examiner

METHOD OF CONTROLLING BRAKING IN RESPONSE TO SENSOR FAILURE IN AUTONOMOUS VEHICLES

CROSS-REFERENCE TO RELATED APPLICATION

The present application claims priority to Korean Patent Application No. 10-2022-0078795 filed on Jun. 28, 2022, the entire contents of which is incorporated herein for all purposes by this reference.

BACKGROUND OF THE PRESENT DISCLOSURE

Field of the Present Disclosure

The present disclosure relates to a method of controlling braking in response to sensor failure for autonomous vehicles, and more specifically, to a method of controlling braking in response to sensor failure for autonomous vehicles, the method being able to accurately apply a braking hydraulic pressure for safe driving with the help of a nearby autonomous vehicle when a braking-related sensor of a host autonomous vehicle has failed.

Description of Related Art

Autonomous vehicles are vehicles each of which travels while recognizing surrounding situations using a variety of sensors and devices without driver's intervention in driving. When a gravity sensor (G sensor), a braking hydraulic sensor, or the like among the variety of sensors has failed, an accident may occur.

For example, while driving of autonomous vehicles, each of the autonomous vehicles performs autonomous driving based on information detected, for example, by not only sensors recognizing surrounding situations, such as a camera, a radio detection and ranging (RADAR) sensor, or a light imaging detection and ranging (LIDAR) sensor, but also sensors related to braking, steering, and the like. When a braking-related sensor, such as the G sensor or the braking hydraulic sensor, among the sensors provided in the autonomous vehicle has failed, braking may not be accurately performed in a situation in which deceleration is required, resulting in an accident.

Accordingly, various approaches are required to prevent an accident when a braking-related sensor has failed while driving of autonomous vehicles.

When it is difficult to directly convert to manual driving due to an abrupt failure of a braking-related sensor while driving of an autonomous vehicle, there is a demand for a method of facilitating the autonomous vehicle to move to a safe place.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a braking control method of responding to sensor failure for vehicles, wherein, when a braking-related sensor, such as a G sensor or a braking hydraulic sensor, has failed while driving of a vehicle (i.e., a host vehicle), the host vehicle may request a nearby another vehicle (i.e., an aid vehicle) determine a deceleration of the host vehicle and transmit deceleration information to the host vehicle. The host vehicle may accurately determine a braking hydraulic pressure based on the deceleration information received from the aid vehicle and apply the accurate braking hydraulic pressure to a braking device. In the present manner, even in the case in which it is difficult to convert the vehicle to manual driving, the host vehicle may drive to a destination or a safe place.

The object of the present disclosure is not limited to the aforementioned object, and the other objects not mentioned may be clearly understood by those with ordinary skill in the art to which the present disclosure pertains (hereinafter 'those skilled in the art') from the following description.

The features of the present disclosure for achieving the object of the present disclosure, and performing the characteristic functions of the present disclosure to be described later are as follows below.

In one aspect, the present disclosure provides a braking control method of responding to sensor failure for vehicles. The braking control method may include: determining, by an controller of a host vehicle, whether or not a braking-related sensor of the host vehicle has failed; determining whether or not a communication device of the host vehicle is in a normal state when the controller concludes that the braking-related sensor has failed; requesting, by the controller of the host vehicle, another vehicle to provide replacement sensor information by which information of the failed braking-related sensor is replaceable; determining, by another vehicle, the replacement sensor information and transmitting the replacement sensor information to the controller of the host vehicle; and receiving, by the controller of the host vehicle, the replacement sensor information from another vehicle and performing braking-related control of the host vehicle.

When the controller requests the replacement sensor information regarding a braking hydraulic pressure sensor and a G sensor or the replacement sensor information regarding a wheel speed sensor as the replacement sensor information regarding the failed braking-related sensor, the controller of another vehicle may determine deceleration information or speed information as the replacement sensor information and transmit the deceleration information or the speed information to the controller of the vehicle.

The braking control method may further include, when the communication device of the vehicle is determined to be in a non-communicable state, attempting to establish a communication connection to a portable smart device of a driver of another vehicle using a portable smart device of a driver of the vehicle.

When the communication connection between the portable smart device of the driver of the vehicle and the portable smart device of the driver of another vehicle is established, the operation of requesting another vehicle to provide the replacement sensor information by which the failed braking-related sensor is replaceable may be performed by the controller of the vehicle.

The braking control method step may further include reviewing, by the controller of the vehicle, whether the vehicle is braking, steering, or accelerating when requesting another vehicle to provide the replacement sensor information.

When the vehicle is braking, steering, or accelerating, the controller of the vehicle may request deceleration information as the replacement sensor information including a first period when requesting another vehicle to provide the replacement sensor information.

When the vehicle is not braking, steering, or accelerating, the controller of the vehicle may request speed information as the replacement sensor information including a second period shorter than the first period when requesting another vehicle to provide the replacement sensor information.

The braking control method may further include determining, by the controller of the vehicle, whether or not a number of another vehicles connected thereto in a communicable manner is two or more.

When the number of another vehicles is determined to be two or more, the controller of the vehicle may receive the replacement sensor information at different alternating periods from a first aid vehicle and a second aid vehicle among another vehicles.

In the performing, by the controller, the braking-related control by receiving the replacement sensor information from another vehicle, when deceleration information is provided as the replacement sensor information from another vehicle, a braking hydraulic pressure for determining braking torque may be determined using a feature in which the deceleration is proportional to the braking torque.

In the performing, by the controller, the braking-related control by receiving the replacement sensor information from another vehicle, when speed information is provided as the replacement sensor information from another vehicle, the speed information may be used for a control operation of the host vehicle for autonomous driving thereof other than the braking-related control.

According to the above-described features for achieving the object of the present disclosure, the present disclosure provides the following effects.

First, in a situation in which a braking-related sensor of an autonomous vehicle (i.e., a host vehicle), such as a G sensor or a braking hydraulic sensor, has failed, when a nearby another autonomous vehicle (i.e., an aid vehicle) determines a deceleration of the host vehicle and transmits deceleration information to the host vehicle, the host vehicle may accurately determine the amount of braking hydraulic pressure actually occurring when decelerating the host vehicle based on the transmitted deceleration information and thus accurately apply braking torque to a braking device. Consequently, it is possible to prevent an accidental change in movement of the host vehicle. Even in the case in which it is difficult to convert the host vehicle to manual driving, the host vehicle may drive to a destination or a safe place.

Second, when a wheel speed sensor of the host vehicle has failed, the host vehicle may be provided with speed information as replacement sensor information from the aid vehicle. Because the current driving speed of the host vehicle may be recognized, the present disclosure may be easily used in other types of control in addition to the braking control.

The effect of the present disclosure is not limited to the aforementioned effect, and the other effects not mentioned may be clearly recognized by those skilled in the art from the following description.

It is understood that the term "automotive" or "vehicular" or other similar term as used herein is inclusive of motor automotives in general such as passenger automobiles including sports utility automotives (operation SUV), buses, trucks, various commercial automotives, watercraft including a variety of boats and ships, aircraft, and the like, and includes hybrid automotives, electric automotives, plug-in hybrid electric automotives, hydrogen-powered automotives and other alternative fuel automotives (e.g., fuels derived from resources other than petroleum). As referred to herein, a hybrid automotive is an automotive that has two or more sources of power, for example both gasoline-powered and electric-powered automotives.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various exemplary features illustrative of the basic principles of the present disclosure. The specific design features of the present disclosure as included herein, including, for example, specific dimensions, orientations, locations, and shapes will be determined in section by the particular intended application and use environment.

In the figures, reference numbers refer to the same or equivalent sections of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the accompanying drawings.

Figure 1:
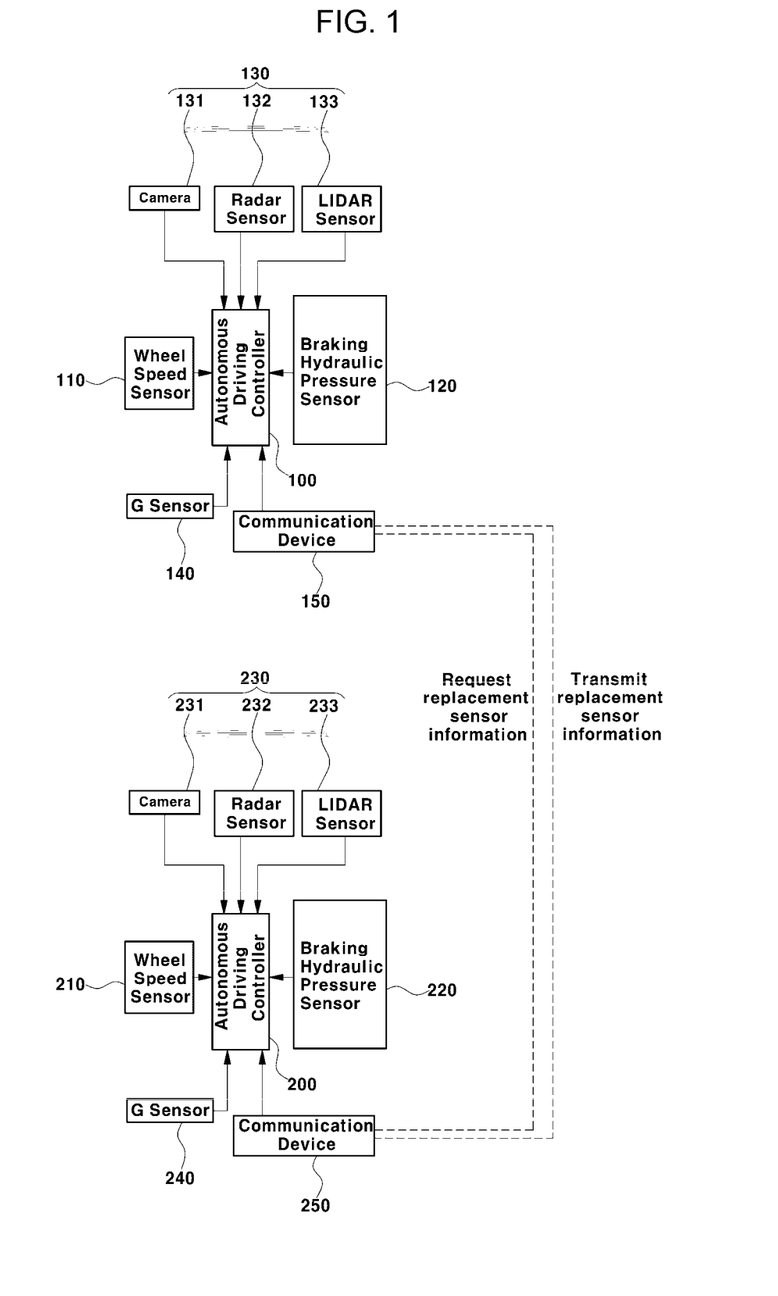
FIG. 1 is a diagram illustrating a configuration for a method of controlling braking in response to sensor failure for autonomous vehicles according to an exemplary embodiment of the present disclosure.
Figure 2:
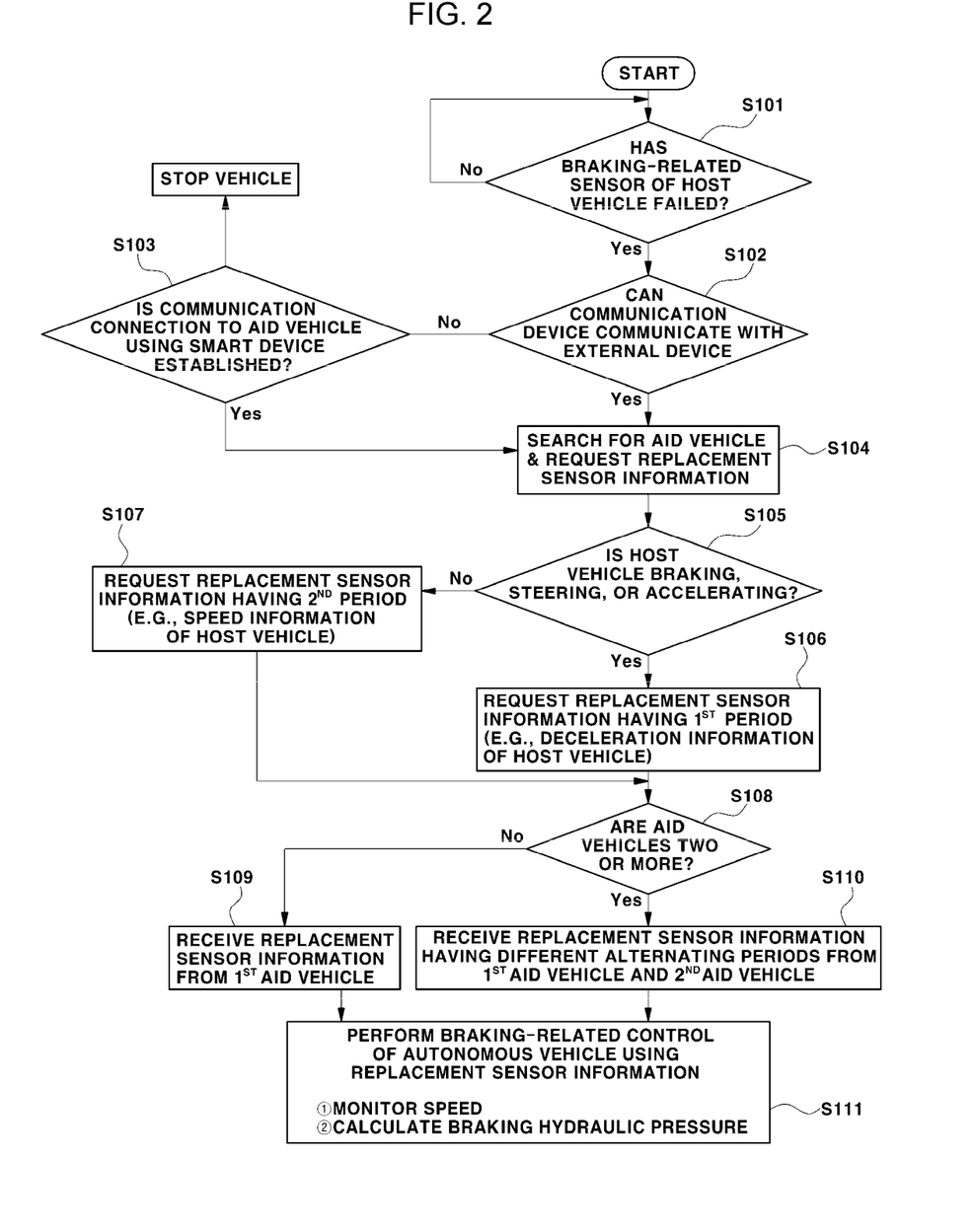
FIG. 2 is a flowchart illustrating the method of controlling braking in response to sensor failure for autonomous vehicles according to an exemplary embodiment of the present disclosure.
Figure 3:
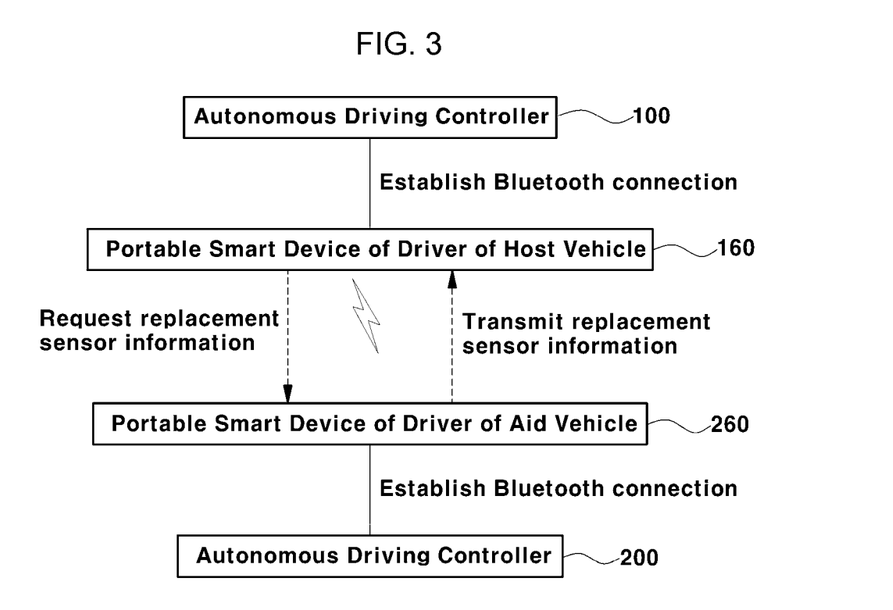
FIG. 3 is a schematic diagram illustrating an example in which communication is performed with an aid vehicle using a smart device to respond to sensor failures for autonomous vehicles according to an exemplary embodiment of the present disclosure.

FIG. 1 is a diagram illustrating a configuration for a method of controlling braking in response to sensor failure for autonomous vehicles according to an exemplary embodiment of the present disclosure, and FIG. 2 is a flowchart illustrating the method of controlling braking in response to sensor failure for autonomous vehicles according to an exemplary embodiment of the present disclosure.

As illustrated in FIG. 1, an autonomous vehicle (i.e., a host vehicle) is provided with various types of sensors as sensors required for autonomous driving. Examples of such sensors include: a wheel speed sensor 110 determining a driving speed, a braking hydraulic pressure sensor 120 detecting a braking hydraulic pressure in the event of braking; distance sensors 130 detecting and determining nearby obstacles and distances to the nearby obstacles, including a camera 131, a radar sensor 132 or a Light Detection and Ranging (LiDAR) sensor 133, and the like; and a G sensor 140 determining acceleration/deceleration of the vehicle. Furthermore, the autonomous vehicle is provided with an autonomous driving controller 100 controlling autonomous driving based on a signal from each of the sensors and determining whether or not each of the sensors has failed using a predetermined logic.

Furthermore, the autonomous vehicle is provided with a communication device 150 communicating with an autonomous driving control or nearby vehicles.

First, while driving of the autonomous vehicle (hereinafter, referred to as a "host vehicle"), the autonomous driving controller 100 determines whether or not each of braking-related sensors has failed in real time using the predetermined logic in S101.

For example, the autonomous driving controller 100 determines whether or not each of the braking-related sensors, such as the braking hydraulic pressure sensor 120 detecting a braking hydraulic pressure, the G sensor 140 determining acceleration/deceleration of the vehicle, and the wheel speed sensor 110 detecting a driving speed, has failed.

When braking-related sensors are determined to have failed as a result of step S101, the autonomous driving controller 100 determines whether or not the communication device 150 of the host vehicle is in a normal state to be communicable with a nearby vehicle in S102.

When the communication device 150 of the host vehicle is determined to be communicable with an external device as a result of step S102, the autonomous driving controller 100 searches for another autonomous vehicle driving around the host vehicle and requests the searched other autonomous vehicle to provide replacement sensor information in S104.

For example, the autonomous driving controller 100 of the host vehicle requests the other autonomous vehicle (hereinafter, referred to as an "aid vehicle") provide replacement sensor information, which may replace detection information of the failed sensors, such as the braking hydraulic pressure sensor 120, the G sensor 140, and the wheel speed sensor 110, through the communication device 150.

When the G sensor 140 of the host vehicle has failed, it is difficult for the autonomous driving controller 100 of the host vehicle to accurately estimate deceleration. Furthermore, when the braking hydraulic pressure sensor 120 of the host vehicle has failed, the autonomous driving controller 100 may not accurately determine the amount of braking hydraulic pressure which is actually generated in deceleration. Thus, braking torque may not be accurately applied to a braking device, accidentally changing the movement of the host vehicle. Furthermore, when the wheel speed sensor 110 has failed, the autonomous driving controller 100 does not recognize the current driving speed of the host vehicle. Thus, the autonomous driving controller 100 of the host vehicle requests the aid vehicle to provide the replacement sensor information, which may replace the detection information of the failed sensor, such as the braking hydraulic pressure sensor 120, the G sensor 140, or the wheel speed sensor 110, through the communication device 150.

Here, the aid vehicle is provided with various types of sensors as sensors required for autonomous driving even if specifications thereof may differ from those of the host vehicle. Examples of the various types of sensors may include: a wheel speed sensor 210 determining a driving speed, a braking hydraulic pressure sensor 220 detecting a braking hydraulic pressure in the event of braking; distance sensors 230 detecting and determining nearby obstacles and distances to the nearby obstacles, including a camera 231, a radar sensor 232 or a LIDAR sensor 233, and the like; and a G sensor 240 determining acceleration/deceleration of the vehicle. Furthermore, the aid vehicle may be provided with an autonomous driving controller 200 controlling autonomous driving based on signals from the respective sensors and a communication device 250.

Meanwhile, when the communication device 150 of the host vehicle is determined to be unable to communicate with an external device through the communication device 150 of the host vehicle due to the failure of the communication device 150 in step S102, an attempt to establish a communication connection to a portable smart device 260 of the driver of the aid vehicle is performed using a portable smart device 160 of the driver of the host vehicle in step S103.

When it is impossible to communicate with an external device using the communication device 150 of the host vehicle, as illustrated in FIG. 2, a communication connection to the portable smart device 260 of the driver of the aid vehicle connected to the autonomous driving controller 200 of the aid vehicle via Bluetooth communication is attempted to be established using the portable smart device 160 of the driver of the host vehicle connected to the autonomous driving controller 100 of the host vehicle via Bluetooth communication. When the communication connection is established, the host vehicle may request the aid vehicle provide the replacement sensor information, which may replace the detection information of the failed sensor, such as the braking hydraulic pressure sensor 120, the G sensor 140, or the wheel speed sensor 110, and receive the replacement sensor information from the aid vehicle.

In the above step S104, when the autonomous driving controller 100 of the host vehicle requests the aid vehicle provide the replacement sensor information for the failed sensor, such as the braking hydraulic pressure sensor 120, the G sensor 140, or the wheel speed sensor 110, the autonomous driving controller 100 reviews whether the host vehicle is braking, steering, or accelerating in step S105.

When the host vehicle is determined to be braking, steering, or accelerating as a result of step S105, the autonomous driving controller 100 of the host vehicle requests the aid vehicle provide replacement sensor information including a predetermined first period when requesting the aid vehicle provide the replacement sensor information for the failed sensor, such as the braking hydraulic pressure sensor 120, the G sensor 140, or the wheel speed sensor 110 in step S106.

The first period refers to a predetermined fastest period (e.g., tens of microseconds).

Here, the replacement sensor information including the first period may be information obtained by the aid vehicle by monitoring the host vehicle using the distance sensors 230 including the camera 231, the radar sensor 232 or the LIDAR sensor 233, and the like and then determining the deceleration of the host vehicle based on the monitored information by the autonomous driving controller 200 of the aid vehicle.

For example, the aid vehicle may detect a change in distance per time of the host vehicle using the distance sensors 230 including the camera 231, the radar sensor 232 or the LIDAR sensor 233, and the like, and then the autonomous driving controller 200 of the aid vehicle may determine a deceleration of the host vehicle based on the detected change in distance per time of the host vehicle.

In contrast, when the host vehicle is not determined to be braking, steering, or accelerating, the autonomous driving controller 100 of the host vehicle requests replacement sensor information including a predetermined second period when requesting the aid vehicle provide the replacement sensor information in step S107.

The second period refers to a predetermined slowest period (e.g., hundreds of microseconds), which is slower than the first period.

For example, the replacement sensor information including the second period may be information regarding the driving speed of the host vehicle monitored using the distance sensors 230 or the like by the aid vehicle.

As described above, the host vehicle requests the aid vehicle provide the replacement sensor information by separating the deceleration information, i.e., the replacement sensor information including the predetermined first period, and the speed information, i.e., the replacement sensor information including the predetermined second period slower than the first period. The autonomous driving controller 200 of the aid vehicle may also have a large amount of computational load due to a plurality of complicated determinations for autonomous driving, and may be subjected to computational load for the replacement sensor information for the host vehicle. Consequently, the computational overload or the insufficient capacity may occur in the autonomous driving controller 200 of the aid vehicle. To prevent such a problem, the host vehicle requests the aid vehicle provide the replacement sensor information by separating the deceleration information and the speed information.

Thus, the autonomous driving controller 200 of the aid vehicle may determine the deceleration information for the host vehicle (i.e., the replacement sensor information requested in the fastest first period) and the speed information for the host vehicle (i.e., the replacement sensor information requested in the slowest second period) by separating the deceleration information and the speed information, preventing the computational overload and the capacity insufficiency of the autonomous driving controller 200 of the aid vehicle.

Accordingly, when the host vehicle requests the aid vehicle provide the deceleration information of the host vehicle as the replacement sensor information including the predetermined first period (e.g., tens of microseconds), the autonomous driving controller 200 of the aid vehicle may easily determine the deceleration of the host vehicle based on the change in distance per time of the host vehicle monitored using the distance sensors 230 or the like and transmit the determined deceleration of the host vehicle to the autonomous driving controller 100 of the host vehicle.

Furthermore, when the host vehicle requests the aid vehicle provide the speed information of the host vehicle as the replacement sensor information including the predetermined second period (e.g., hundreds of microseconds) slower than the first period, the autonomous driving controller 200 of the aid vehicle may easily transmit the speed information of the host vehicle monitored using the distance sensors 230 or the like to the autonomous driving controller 100 of the host vehicle.

Meanwhile, the autonomous driving controller 100 of the host vehicle may determine whether or not two or more aid vehicles configured for providing the above-described replacement sensor information are connected thereto in a communicable manner in step S108, and when the number of aid vehicle connected thereto is determined to be one, be provided with the replacement sensor information from the aid vehicle in a manner as described above in step S109.

In contrast, when the number of aid vehicles connected thereto is determined to be two or more, the autonomous driving controller 100 of the host vehicle may be more rapidly provided with the replacement sensor information from a first aid vehicle and a second aid vehicle at different alternating periods in step S110.

That is, the autonomous driving controller 100 of the host vehicle may receive the deceleration information or the speed information from the first aid vehicle and the second aid vehicle at different periods to receive the deceleration information or the speed information at a faster period.

For example, when the host vehicle requests the first aid vehicle provide the deceleration information or the speed information at a period of 100 msecs, 300 msecs, 500 msecs, or the like and requests the second aid vehicle provide deceleration information or the speed information at a period of 200 msecs, 400 msecs, 600 msecs, or the like, the host vehicle may receive data, such as the deceleration information or the speed information at a period of 100 msecs, reducing the load of the first aid vehicle and the second aid vehicle to determine the replacement sensor information.

Afterwards, the autonomous driving controller 100 of the host vehicle performs braking-related control over the host vehicle using the replacement sensor information provided from the aid vehicle in step S111.

When the deceleration information as the replacement sensor information is received from the aid vehicle, the autonomous driving controller 100 of the host vehicle may accurately determine a braking hydraulic pressure using the following Equation 1.

$$\text{Torque}_{Brake} = 2 \times \mu \times p \times A_{piston} \times R_{effective} \quad \text{(Equation 1)}$$

In Equation 1 above, $\mu$ indicates a coefficient of friction, p indicates a braking hydraulic pressure, $A_{piston}$ indicates a cross-sectional area of a piston of a wheel cylinder, and $R_{effective}$ indicates an effective radius of a braking disk.

The deceleration of the autonomous vehicle provided from the aid vehicle is a value proportional to the braking torque $\text{Torque}_{Brake}$, and the coefficient of friction, the cross-sectional area of the piston of the wheel cylinder, the effective radius of the braking disk, and the like are constants. Thus, the braking pressure may be easily determined.

Thus, when the braking hydraulic pressure sensor 120 and the G sensor 140 of the host vehicle have failed, the autonomous driving controller 100 may accurately determine the amount of the braking hydraulic pressure actually occurring during deceleration of the autonomous driving controller 100 and accurately apply the braking torque to the braking device, preventing an accidental change in the movement of the autonomous vehicle. Furthermore, even when it is difficult to convert the autonomous vehicle into manual driving, the autonomous vehicle may drive to a destination or a safe place.

Furthermore, when the wheel speed sensor 110 of the host vehicle has failed, the autonomous driving controller 100 is provided with the speed information as the replacement sensor information from the aid vehicle. Although the speed information is not directly used in the braking control, the autonomous driving controller 100 may recognize the current driving speed of the host vehicle based on the speed information. Accordingly, the speed information may be easily used for different control operations for the autonomous driving in addition to the braking control.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of controlling braking in response to sensor failures for vehicles, the method comprising:
   determining, by a controller of a host vehicle, whether or not a braking-related sensor of the host vehicle has failed;
   determining whether or not a communication device of the host vehicle is in a normal state when the controller concludes that the braking-related sensor has failed;
   requesting, by the controller of the host vehicle, another vehicle to provide replacement sensor information by which information of the failed braking-related sensor is replaceable;
   determining, by a controller of the another vehicle, the replacement sensor information and transmitting the replacement sensor information to the controller of the host vehicle;
   receiving, by the controller of the host vehicle, the replacement sensor information from the another vehicle and performing braking-related control of the host vehicle upon receiving the replacement sensor information; and
   reviewing, by the controller of the host vehicle, whether the host vehicle is braking, steering, or accelerating when requesting another vehicle to provide the replacement sensor information,
   wherein, when the host vehicle is not braking, steering, or accelerating, the controller of the host vehicle is configured to request speed information as the replacement sensor information including a second period shorter than a first period when requesting the another vehicle to provide the replacement sensor information.

2. The braking control method of claim 1, wherein, when the controller of the host vehicle requests the replacement sensor information regarding a braking hydraulic pressure sensor and a gravity (G) sensor or the replacement sensor information regarding a wheel speed sensor as the replacement sensor information regarding the failed braking-related sensor, the controller of the another vehicle is configured to determine deceleration information or the speed information as the replacement sensor information and to transmit the deceleration information or the speed information to the controller of the vehicle.

3. The braking control method of claim 1, further including:
   when the communication device of the vehicle is determined to be in a non-communicable state, attempting, by the controller of the host vehicle, to establish a communication connection to a portable smart device of a driver of the another vehicle using a portable smart device of a driver of the host vehicle.

4. The braking control method of claim 3, wherein, when the communication connection between the portable smart device of the driver of the host vehicle and the portable smart device of the driver of the another vehicle is established, requesting, by the controller of the host vehicle, the another vehicle to provide the replacement sensor information by which the failed braking-related sensor is replaceable.

5. The braking control method of claim 1, wherein, when the host vehicle is braking, steering, or accelerating, the controller of the host vehicle is configured to request deceleration information as the replacement sensor information including the first period when requesting the another vehicle to provide the replacement sensor information.

6. The braking control method of claim 1, further including determining, by the controller of the host vehicle, whether or not a number of another vehicles connected thereto in a communicable manner is two or more.

7. The braking control method of claim 6, wherein when the number of the another vehicles is determined to be two or more, the controller of the host vehicle is configured to receive the replacement sensor information at different alternating periods from a first aid vehicle and a second aid vehicle among the another vehicles.

8. The braking control method of claim 1, wherein, in the performing, by the controller, the braking-related control by receiving the replacement sensor information from the another vehicle, when deceleration information is provided as the replacement sensor information from the another vehicle, a braking hydraulic pressure for determining braking torque of the host vehicle is determined using a feature in which deceleration of the host vehicle is proportional to the braking torque.

9. The braking control method of claim 1, wherein, in the performing, by the controller of the host vehicle, the braking-related control by receiving the replacement sensor information from the another vehicle, when the speed information is provided as the replacement sensor information from the another vehicle, the speed information is used for a control operation of the host vehicle for autonomous driving thereof other than the braking-related control.

10. An apparatus of controlling braking in response to sensor failures for a host vehicle, the apparatus comprising:
a processor of the host vehicle, configured for:
determining whether or not a braking-related sensor of the host vehicle has failed;
determining whether or not a communication device of the host vehicle is in a normal state when the processor concludes that the braking-related sensor has failed;
requesting another vehicle to provide replacement sensor information by which information of the failed braking-related sensor is replaceable;
receiving the replacement sensor information from the another vehicle and performing braking-related control of the host vehicle upon receiving the replacement sensor information; and
a storage configured to store data and algorithms driven by the processor,
wherein the processor of the host vehicle is configured to review whether the host vehicle is braking, steering, or accelerating when requesting the another vehicle to provide the replacement sensor information, and
wherein, when the vehicle is not braking, steering, or accelerating, the processor of the host vehicle is configured to request speed information as the replacement sensor information including a second period shorter than a first period when requesting the another vehicle to provide the replacement sensor information.

11. The apparatus of claim 10, wherein, when the processor of the host vehicle requests the replacement sensor information regarding a braking hydraulic pressure sensor and a gravity (G) sensor or the replacement sensor information regarding a wheel speed sensor as the replacement sensor information regarding the failed braking-related sensor, the processor of the host vehicle is configured to receive deceleration information or the speed information determined by a processor of the another vehicle as the replacement sensor information.

12. The apparatus of claim 10, further including:
when the communication device of the vehicle is determined to be in a non-communicable state, the processor of the host vehicle is configured to attempt to establish a communication connection to a portable smart device of a driver of the another vehicle using a portable smart device of a driver of the host vehicle.

13. The apparatus of claim 12, wherein, when the communication connection between the portable smart device of the driver of the vehicle and the portable smart device of the driver of the another vehicle is established, the processor of the host vehicle is configured to request the another vehicle to provide the replacement sensor information by which the failed braking-related sensor is replaceable.

14. The apparatus of claim 10, wherein, when the vehicle is braking, steering, or accelerating, the processor of the host vehicle is configured to request deceleration information as the replacement sensor information including the first period when requesting the another vehicle to provide the replacement sensor information.

15. The apparatus of claim 10, wherein the processor of the host vehicle is configured to determine whether or not a number of another vehicles connected thereto in a communicable manner is two or more.

16. The apparatus of claim 15, wherein when the number of another vehicles is determined to be two or more, the processor of the host vehicle is configured to receive the replacement sensor information at different alternating periods from a first aid vehicle and a second aid vehicle among another vehicles.

* * * * *